United States Patent [19]

Lawson et al.

[11] 4,422,959

[45] Dec. 27, 1983

[54] HYDROCRACKING PROCESS AND CATALYST

[75] Inventors: Randy J. Lawson, Arlington Heights; Russell W. Johnson, Villa Park; Lee Hilfman, Mt. Prospect, all of Ill.

[73] Assignee: UOP Inc., Des Plaines, Ill.

[21] Appl. No.: 376,080

[22] Filed: May 7, 1982

[51] Int. Cl.$^3$ .................. C10G 13/02; B01J 37/02; B01J 21/12

[52] U.S. Cl. .................. 502/247; 208/111; 502/235; 502/337

[58] Field of Search ............ 252/455 R, 464

[56] References Cited

U.S. PATENT DOCUMENTS

| | | | |
|---|---|---|---|
| 1,935,177 | 11/1933 | Connolly et al. | 252/455 R |
| 2,264,434 | 12/1941 | Connolly | 252/455 R |
| 2,317,803 | 4/1943 | Reeves et al. | 252/455 R |
| 2,643,980 | 6/1953 | Houdry | 252/455 R |
| 2,982,802 | 5/1961 | Folkins et al. | 252/455 R |
| 3,165,463 | 1/1965 | Gleim et al. | 208/264 |
| 3,184,404 | 5/1965 | Flinn et al. | 208/112 |
| 3,634,332 | 1/1972 | Bambrick et al. | 252/455 R |
| 3,825,504 | 7/1974 | Hilfman | 252/455 R |
| 3,931,048 | 1/1976 | Hilfman | 252/455 R |
| 3,956,104 | 5/1976 | Hilfman et al. | 208/111 |
| 4,035,417 | 7/1977 | Izawa et al. | 252/464 |

*Primary Examiner*—Delbert E. Gantz
*Assistant Examiner*—Chung K. Pak
*Attorney, Agent, or Firm*—James R. Hoatson, Jr.; John G. Cutts, Jr.; William H. Page, II

[57] ABSTRACT

A catalytic composite is disclosed which catalyst comprises a silica-alumina carrier material, a nickel component and a vanadium component, and which catalyst is useful for the conversion of hydrocarbons. A preferred method of perparation comprises the incorporation of the vanadium component from an alcoholic solution of a vanadium compound.

4 Claims, No Drawings

HYDROCRACKING PROCESS AND CATALYST

BACKGROUND OF THE INVENTION

The field of art to which this invention pertains is the catalytic conversion of hydrocarbons. This invention also relates to hydrocarbon conversion catalysts and their methods of manufacture. The catalyst composite of the present invention demonstrates unexpected and exceptional activity, selectivity and resistance to deactivation when employed in a hydrocarbon conversion process. More particularly, the invention relates to a catalyst which is useful for performing destructive hydrogenation or hydrocracking of hydrocarbons.

DESCRIPTION OF THE PRIOR ART

Destructive hydrogenation by catalytic means, more commonly called hydrocracking, is old and well-known in the prior art. Destructive hydrogenation of the hydrocarbon oil, which may be high-boiling fractions, such as gas oils, topped crude, shale oil, and tar sand extract, generally is performed at relatively high temperature and pressures of the order of 700° F. and 1000 psig and upward. Catalysts for the destructive hydrogenation of hydrocarbons are generally a combination of hydrogenation and cracking catalysts.

Although hydrocracking can be effected thermally, catalysts offer a substantial improvement. The prior art hydroconversion catalyst will typically comprise a cracking component, for example, silica, alumina, silica-alumina, or other acid-acting refractory inorganic oxide, and a hydrogenation component.

Hydrocracking catalysts containing a crystalline aluminosilicate dispersed in the acid-acting refractory inorganic oxide have been shown to be particularly effective in the hydrocracking process. One or more hydrogenation components have been selected by the prior art to serve as the hydrogenation component in hydroconversion catalysts. The prior art has broadly taught that hydrogenation components may be selected from at least the following metals: iron, cobalt, nickel, ruthenium, rhodium, palladium, osmium, iridium, platinum, chromium, molybdenum, tungsten, vanadium, niobium and tantalum.

In U.S. Pat. No. 3,956,104 (Hilfman et al), a preferred hydrocracking catalyst contained molybdenum and nickel. In U.S. Pat. No. 3,931,048 (Hilfman et al), a preferred hydrocracking catalyst comprises nickel, tungsten and a silica-alumina carrier material. U.S. Pat. No. 3,184,,404 (Flinn et al) teaches the combination of tungsten and a metal selected from Group VIII of the Periodic Table of the Elements on an alumina support as an effective hydrocracking catalyst. The hereinabove mentioned patents relate to hydrocracking catalysts which are associated with refractory inorganic oxide support materials and which patents provide examples of some of the prior art catalysts.

Another U.S. Pat. No. 3,825,504 (Hilfman) teaches the use and preparation of a co-extruded hydrocracking catalyst comprising a nickel component and an alumina-containing porous carrier material. According to this patent, a preferred method of preparation is the physical admixture of a finely-divided nickel salt and a vanadium salt with a silica-alumina carrier material. This solid mixture is then ground to a powder having a size of about 40 mesh and extruded. The resulting extrudates are dried and calcined to yield a catalyst containing less than about 0.1 weight percent nickel aluminate. According to the patentee, the presence of the vanadium salt is critical for a co-extruded catalyst and inhibits the reaction of the nickel component with the alumina which produces an active catalyst.

In the art of hydrocarbon processing, such as fluid catalytic cracking (FCC), it is well known to use an amorphous silica-alumina catalyst for the conversion of the hydrocarbons. FCC is distinguished from hydrocracking by FCC's relatively low pressure of less than about 100 psig and the absence of externally added hydrogen. In process units which are used for the conversion of residual crude oil, particularly FCC units, the silica-alumina catalyst becomes contaminated with trace quantities of nickel and vanadium which are quantitatively removed from the crude oil. These indigenous contaminating metals are usually present in crude oil in amounts of 200 ppm or less, but after extended processing of metal-contaminated crude oil, the catalyst accumulates an appreciable quantity of metals which is extremely undesirable from the standpoint of FCC processing. Attenuation or actual removal of these undesirable metal accumulations is deemed necessary for the economic operation of a residual oil FCC unit. Therefore, the FCC process cannot profitably utilize a catalyst comprising active catalytic metals of nickel and vanadium and in any event does not employ the addition of hydrogen from an external source. Furthermore, the inadvertent formulation of the catalyst comprising nickel, vanadium and silica-alumina during the processing of metal-containing feedstocks in an FCC unit while using silica-alumina catalyst involves the topical deposition of nickel and vanadium upon the silica-alumina particles by the adhesion of organometallic components which are contained in the metal-containing feedstocks, in contradistinction to the formulation of the catalyst by the method of the present invention as hereinafter discussed. By the very nature of the FCC process, the silica-alumina particles together with the organometallic components are subjected to high temperature regeneration wherein the coke or carbon is burned off. After regeneration of the catalyst, it is believed that because of the method of incorporation, the nickel and vanadium is situated in a random manner on the surface of the silica-alumina particles which results in a distinctly different composition of matter as compared to the catalyst composition of the present invention.

Another mode of hydroconversion of hydrocarbons is the use of unsupported finely divided catalyst in a slurry hydrocarbon conversion process. This process utilizes a suspension of finely divided catalyst which is admixed with the hydrocarbon feedstock during the conversion processing step. For example, U.S. Pat. No. 3,165,463 (Gleim et al) teaches a process for the hydrorefining of a hydrocarbon charge stock with a finely divided slurry catalyst which is selected from vanadium, niobium, tantalum, molybdenum, tungsten, iron, cobalt and nickel.

It is generally recognized that catalysis is a mechanism particularly noted for its unpredictable nature. Minor variations in a method of manufacture often result in an unexpected improvement in the catalyst product with respect to a given hydrocarbon conversion reaction. The improvement may be the result of an undetermined alteration in the physical character and/or composition of the catalyst product difficult to define and apparent only as a result of the unexpected improvement in the catalyst activity, selectivity and/or stability.

One of the discoveries of the present invention is a novel catalyst which exhibits improved and unexpected hydrocarbon conversion characteristics. The present invention also describes the utilization of the novel catalyst in a hydrocarbon conversion process. Another embodiment of the present invention describes methods for preparing catalysts.

SUMMARY OF THE INVENTION

Accordingly, the invention is, in one embodiment a catalytic composite comprising a combination of a carrier material, a nickel component which is incorporated in the composite in an amount from about 0.1 to about 10 weight percent of the composite based on the elemental metal and a vanadium component which is incorporated in the catalytic composite by means of an alcoholic solution of a vanadium compound in an amount from about 0.1 to about 10 weight percent of the composite based on the elemental metal, the carrier material comprising a co-gelled silica-alumina carrier material which comprises from about 20 weight percent to about 80 weight percent silica.

In a second embodiment, the invention is a process for converting a hydrocarbon charge stock into lower boiling hydrocarbon products which comprises reacting the charge stock with an external source of hydrogen at hydrocracking conditions in contact with a catalytic composite comprising a combination of a carrier material, a nickel component which is incorporated in the composite in an amount from about 0.1 to about 10 weight percent of the composite based on the elemental metal and a vanadium component which is incorporated in the catalytic composite by means of an alcoholic solution of a vanadium compound in an amount from about 0.1 to about 10 weight percent of the composite based on the elemental metal, the carrier material comprising a co-gelled silica-alumina carrier material which comprises from about 20 weight percent to about 80 weight percent silica.

In a third embodiment, the invention is a method for the preparation of catalysts, having hydrocracking activity, comprising a combination of a carrier material, a nickel component which is incorporated in the composite in an amount from about 0.1 to about 10 weight percent of the composite based on the elemental metal and a vanadium component which is incorporated in the catalytic composite by means of an alcoholic solution of a vanadium compound in an amount from about 0.1 to about 10 weight percent of the composite based on the elemental metal, the carrier material comprising a co-gelled silica-alumina carrier material which comprises from about 20 weight percent to about 80 weight percent silica, which method comprises: (a) the sequential incorporation of each metal component on the carrier material; and (b) the calcination of the carrier material following each metal component incorporation.

In a fourth embodiment, the invention is a method for the preparation of catalysts, having hydrocracking activity, comprising a combination of a catalytic composite comprising a combination of a carrier material, a nickel component in an amount from about 0.1 to about 10 weight percent of the composite based on the elemental metal and a vanadium component in an amount from about 0.1 to about 10 weight percent of the composite based on the elemental metal, the carrier material comprising a co-gelled silica-alumina carrier material which comprises from about 20 weight percent to about 80 weight percent silica, which method comprises: (a) impregnating the co-gelled silica-alumina carrier material with an alcoholic solution of a vanadium compound and a nickel compound; and (b) calcining the resulting impregnated carrier material containing a nickel component and a vanadium component from step (a).

Other embodiments of the present invention encompass further details such as specific concentrations of the catalytic composite, methods of preparation, preferred feedstocks, and hydrocracking conditions, all of which are hereinafter disclosed in the following discussion of each of these facets of the invention.

DETAILED DESCRIPTION OF THE INVENTION

The hydrocarbon charge stock subject to hydroconversion in accordance with the process of this invention is suitably a petroleum hydrocarbon fraction boiling in the range of from about 400° F. to about 1200° F. Pursuant to the present process, the hydrocarbon charge stock is reacted with an external source of hydrogen at hydroconversion conditions including a hydrogen pressure from about 500 psig to about 3,000 psig and a temperature of from about 500° F. to about 900° F.

Petroleum hydrocarbon fractions which can be utilized as charge stocks thus include the gas oils, fuel oils, kerosene, etc., recovered as distillate in the atmospheric distillation of crude oils, also the light and heavy vacuum gas oils resulting from the vacuum distillation of the reduced crude, the light and heavy cycle oils recovered from the catalytic cracking process, light and heavy coker gas oils resulting from low pressure coking, coal tar distillates and the like. Residual oils, often referred to as asphaltum oil, liquid asphalt, black oil, residuum, etc., obtained as liquid or semi-liquid residues after the atmospheric or vacuum distillation of crude oils, are operable in this process although it may be desirable to blend such oils with lower boiling petroleum hydrocarbon fractions for economical operation. The petroleum hydrocarbon charge stock may boil substantially continuously between about 400° F. to about 1200° F. or it may consist of any one, or a number of petroleum hydrocarbon fractions, such as are set out above, which distill over within the 400°–1200° F. range. Suitable hydrocarbon feedstocks also include hydrocarbons derived from tar sand and oil shale.

Since the petroleum hydrocarbons and other hydrocarbons as well which are hydroprocessed according to the process of this invention boil over a considerably wide range, it may be readily perceived that suitable reaction temperatures will lie within a correspondingly wide range, the preferred temperature ranges depending in each instance upon the particular petroleum hydrocarbon fraction utilized as a charge stock. For example, reaction temperatures of from about 500° to about 1000° F. are generally operable. However, where the particular petroleum hydrocarbon fraction utilized boils within the range of from about 700° to about 900° F., it is preferred to operate at reaction temperatures in the more restricted range of from about 500° to about 800° F.

Pursuant to the present invention and as hereinabove mentioned, an external source of hydrogen is reacted with the hydrocarbon charge stock at a pressure of from about 500 psig to about 3000 psig, and preferably at a pressure from about 1200 psig to about 2000 psig. The hydrogen circulation rate is preferably from about 2000 standard cubic feet to about 20,000 standard cubic feet per barrel of charge stock, although amounts of from about 1,000 standard cubic feet to as much as 30,000 standard cubic feet per barrel are operable. The liquid hourly space velocity of the petroleum hydrocarbon charge stock is preferably from about 0.2 to about 10 depending on the particular charge employed and the reaction temperatures necessitated thereby. A suitable correlation between space velocity and reaction temperature can be readily determined by one skilled in the art in any particular instance. When utilizing a charge stock boiling in the range of from about 700° to about 900° F., a liquid hourly space velocity of from about 1 to about 3 is preferred.

In accordance with another embodiment of the present invention, further details of the catalyst, its specific concentrations and methods of preparation are hereinafter discussed. As is customary in the art of catalysis, when referring to the catalytically active metal, or metals, it is intended to encompass the existence of such metal in the elemental state or in some form such as an oxide, sulfide, halide, etc. Regardless of the state in which the metallic component actually exists, the concentrations are computed as if they existed in the elemental state.

The silica-alumina carrier material which comprises a portion of the catalyst of the present invention may be prepared in any convenient manner known in the prior art. However, according to a preferred method of the present invention, the silica-alumina carrier material is co-gelled. The co-gelled silica-alumina may be prepared and utilized as spheres, pills, pellets, extrudates, granules, etc. In a preferred method of manufacture, an aqueous water glass solution, diluted to a silica concentration of from about 5 to about 15 wt.%, is acidified with hydrochloric acid or other suitable mineral acid. The resulting sol is acid aged at a pH of from about 4 to about 4.8 to form a hydrogel, and the hydrogel is further aged at a pH of from about 6.5 to about 7.5. The silica hydrogel is then thoroughly admixed with an aqueous aluminum salt solution of sufficient concentration to provide a desirable alumina content in the silica-alumina product. The silica-alumina sol is then precipitated at a pH of about 8 by the addition of a basic precipitating agent, suitably aqueous ammonium hydroxide. The silica-alumina, which exists as a hydrogel slurried in a mother liquor, is recovered by filtration, water-washed and dried at a temperature of from about 200° to about 500° F. Drying is preferably by spray-drying techniques whereby the co-gelled silica-alumina is recovered as microspheres, admixed with a suitable binding agent such as graphite, polyvinyl alcohol, etc., and extruded or otherwise compressed into pills or pellets or any other uniform size and shape.

The particularly preferred method for preparing the co-gelled silica-alumina support is by the well-known oil drop method which permits the utilization of the support in the form of macrospheres. For example, an alumina sol, utilized as an alumina source, is commingled with an acidified water glass solution as a silica source, and the mixture further commingled with a suitable gelling agent, for example urea, hexamethylenetetramine, or mixtures thereof. The mixture is discharged while still below gelation temperature, and by means of a nozzle or rotating disc, into a hot oil bath maintained at gelation temperature. The mixing is dispersed into the oil bath as droplets which form into spheroidal gel particles during passage therethrough.

The aluminum sol is preferably prepared by a method wherein aluminum pellets are commingled with a quantity of treated or deionized water, and hydrochloric acid added thereto in a sufficient amount to digest a portion of the aluminum metal and form the desired sol. A suitable reaction rate is effected at about reflux temperature of the mixture.

The spheroidal gel particles prepared by the oil drop method are aged, usually in the oil bath, for a period of at least 10–16 hours, and then in a suitable alkaline or basic medium for at least 3 to about 10 hours, and finally water washed. Proper gelation of the mixture in the oil bath, as well as subsequent aging of the gel spheres, is not readily accomplished below about 120° F., and at about 210° F., the rapid evolution of the gases tend to rupture and otherwise weaken the spheres. By maintaining sufficient superatmospheric pressure during the forming and aging steps in order to maintain water in the liquid phase, a higher temperature can be employed, frequently with improved results. If the gel particles are aged at superatmospheric pressure, no alkaline aging step is required.

The spheres are water-washed, preferably with water containing a small amount of ammonium hydroxide and/or ammonium nitrate. After washing, the sphéres are dried, at a temperature from 200° to about 600° F. for a period of from about 6 to about 24 hours or more, and then calcined at a temperature from about 800° to about 1400° F. for a period from about 2 to about 12 hours or more. A preferred silica-alumina carrier material contains from about 20 weight percent to about 80 weight percent silica.

In accordance with the present invention, the nickel component and the vanadium component are composited with the co-gelled silica-alumina carrier material as described hereinafter. The nickel component may be incorporated either before, after or simultaneously with the incorporation of the vanadium component. The nickel component may be composited with the co-gelled silica-alumina carrier material by any suitable solution impregnation technique. In the event that the nickel component is to be composited before the vanadium component, the carrier material containing nickel is dried and calcined before the incorporation of the vanadium component. Thus, for example, the carrier material may be soaked, dipped, suspended, or otherwise immersed in an aqueous impregnating solution containing a soluble nickel salt to effect the incorporation of the nickel component. One suitable method comprises immersing the carrier material in the nickel impregnating solution and evaporating the same to dryness in a rotary steam dryer The concentration of the impregnating solution is such as to ensure a final catalyst composite comprising from about 0.1 to about 10 percent by weight nickel. A suitable nickel salt for impregnating the catalyst of the present invention is nickel nitrate. After the nickel component has been incorporated with the silica-alumina carrier material, the nickel containing carrier material is usually dried at a temperature from about 200° F. to about 500° F. for a period of time from about 1 to about 10 hours. The dried carrier material is then calcined in an oxidizing atmosphere at a temperature from about 700° to about 1300° F. or more. The oxidizing atmosphere is suitably air, although other gases comprising molecular oxygen may be employed. Other convenient and suitable impregnation techniques may also be employed for the incorporation of the nickel component.

Regardless of the incorporation techniques utilized, the order in which each nickel component or vanadium component is composited with the silica-alumina carrier material is not critical to the present invention. The silica-alumina carrier material is preferably dried and calcined after each metal component has been added to the carrier material. In the event that the vanadium component is to be composited before the nickel component, the carrier material containing vanadium is dried and calcined before the incorporation of the nickel component. In the event of co-impregnation of nickel and vanadium from an alcoholic solution thereof, a single calcination is sufficient.

In accordance with the present invention, the vanadium component is composited with the silica-alumina carrier material by impregnating the carrier material with an alcoholic solution of a vanadium compound. Generally the compounds of vanadium are insoluble in water, thereby precluding the use of aqueous solutions of vanadium for catalyst preparation. The preferred solution is a methanol solution of vanadium chloride. Another preferred solution is a methanol solution of vanadium oxychloride. Since the solubility of vanadium chloride even in methanol is low, the incorporation may be more easily accomplished by the use of a technique which is similar to that used in the Sohxlet extractor method. In the event that the vanadium component is to be composited before the nickel component, the carrier material containing vanadium is preferably dried and calcined before contact is made with a nickel component. A preferred concentration of the vanadium component in the finished composite is from about 0.1 to about 10 weight percent based on elemental metal.

After the silica-alumina carrier material has been incorporated with either one or both of the appropriate metals, the catalyst composite is usually dried at a temperature from about 200° to about 500° F. for a period of time from about 1 to about 10 hours prior to calcination. In accordance with the present invention, calcination is effected in an oxidizing atmosphere at a temperature from about 700° to about 1300° F. or more. The oxidizing atmosphere is suitably air, although other gases comprising molecular oxygen may be employed.

Without wishing to be bound by a theory, it is believed that the impregnation of the silica-alumina carrier material with a nickel compound and an alcoholic solution of a vanadium compound permits, in marked contradistinction with the hereinabove discussed inadvertently formulated nickel, vanadium and silica-alumina catalyst, a homogeneous deposition of the metal components throughout the catalyst particle while at the same time promoting a favorable interaction of the metal moieties with each other and with the silica-alumina carrier material and all of which is believed to contribute to the superior performance of the finished catalyst composite.

Following the high temperature oxidation procedure, the catalyst is usually reduced for a period of from about 0.5 to about 10 hours at a temperature in the range of from about 700° to about 1000° F. in the presence of hydrogen. The catalyst as used in accordance with the present invention may be used in a sulfided form. Thus, after reduction the catalyst may be subjected to sulfidation by passing hydrogen sulfide, or other suitable sulfur-containing compounds, in contact therewith, preferably at an elevated temperature of from about 500° to about 1100° F. The reduced catalyst is preferably sulfided by contacting the catalyst with a stream of hydrogen containing from about 1 to about 20 percent or more by volume of hydrogen sulfide at elevated temperatures from about 500° to about 1100° F. When the petroleum hydrocarbon to be hydroconverted contains sulfur compounds, by design or otherwise, sulfidation may be suitably effected in situ in the initial stages of the hydroconversion process.

The catalyst composite, prepared in accordance with the method of this invention may be employed in any type of a convenient reaction zone. However, in accordance with a preferred embodiment of the present invention, the catalyst is employed in a reaction zone as a fixed bed. The hydrocarbon charge stock after being combined with hydrogen in an amount of from about 2,000 to about 20,000 standard cubic feet per barrel, and preferably at least about 5,000 standard cubic feet per barrel, is introduced into the reaction zone. The charge stock may be in a liquid, vapor, or liquid-vapor phase mixture, depending upon the temperature, pressure, proportion of hydrogen and the boiling range of the charge stock being processed. As hereinabove described, the liquid hourly space velocity through the reaction zone will be in excess of about 0.1 and generally in the range of from about 0.5 to about 10. The source of hydrogen being admixed with a hydrocarbon charge stock may comprise a hydrogen-rich gas stream which is withdrawn from a high pressure, low-temperature separation zone and recycled to supply at least a portion of such hydrogen. Excess hydrogen resulting from the various dehydrogenation reactions effected in a catalytic reforming unit may also be employed in admixture with the hydrocarbon charge. In accordance with the present invention, an external source of hydrogen is required for the hydrocracking process. The reaction zone as hereinabove described will operate under an imposed pressure within the range of from about 500 to about 3,000 lbs. per square inch gauge (psig). The catalyst bed inlet temperature is maintained within the range of from about 350° F. to about 800° F. Since the hydroconversion reactions are exothermic, the outlet temperature or the temperature at the bottom of the catalyst bed will be significantly higher than that at the inlet thereto. The degree of exothermicity exhibited by the temperature rise across the catalyst bed is at least partially dependent upon the character of the charge stock passing therethrough, the rate at which the normally liquid hydrocarbon charge contacts the catalyst bed, the intended degree of conversion to lower-boiling hydrocarbon products, etc. In any event, the catalyst bed inlet temperature will be such that the exothermicity of the reactions taking place does not cause the temperature at the outlet of the bed to exceed about 900° F., and preferably, 850° F. The hydroconversion operation may also be effected as a moving-bed type, or suspensoid type of operation in which the catalyst, hydrocarbon and hydrogen are admixed and passed as a slurry through the reaction zone.

Although the method of preparing the catalyst, and careful selection of operating condition within the ranges hereinbefore set forth, extend the effective life of the catalyst composite, regeneration thereof may eventually become desirable due to the natural deterioration of the catalytically active metallic components. The catalytic composite is readily regenerated by treating the same in an oxidizing atmosphere, at a temperature of from about 750° F. to about 850° F., and burning coke and other heavy hydrocarbonaceous material therefrom. The catalyst composite may then be subjected to the reducing action in hydrogen, in situ, at a temperature within the range of from about 1000° to about 1200° F. If desirable, the catalyst may then be sulfided in the same manner as fresh catalyst as hereinbefore described.

The following examples are given to further illustrate the catalyst and hydrocarbon conversion process of the present invention. It is understood that these examples are to be illustrative rather than restrictive. Specific catalyst compositions, catalyst preparation techniques, processing techniques, processing conditions and other details are presented for description but it is not intended that the invention be limited to the specifics, nor is it intended that a given catalyst or process be limited to the particulars mentioned.

EXAMPLE I

This example describes the preparation and testing of a silica-alumina-nickel catalyst which comprises 0.6 weight percent nickel. The silica-alumina material was a co-gelled support material and was prepared by the hereinabove described oil-drop method. The ratio of silica and alumina sources was selected to yield a 50/50 mixture of silica and alumina. The finished silica-alumina support material was in the form of 1/16 inch spheres and had an apparent bulk density of about 0.6. A portion of the hereinabove described silica-alumina carrier material was impregnated with an aqueous solution of nickel nitrate. The impregnated spheres were dried and then oxidized in air (calcined) at a temperature of 1100° F. The concentration of nickel nitrate solution was selected to yield a finished catalyst which contained 0.6 weight percent nickel. This batch of finished catalyst will hereinafter be referred to as Catalyst 1. Catalyst 1 was then used in the hydrocracking of a vacuum gas oil whose properties are summarized in Table I.

TABLE I

| Properties of Vacuum Gas Oil | |
|---|---|
| API° Gravity at 60° F. | 21.6 |
| Specific Gravity at 60° F. | 0.9242 |
| Distillation, °F. | |
| IBP | 441 |
| 10 | 619 |
| 30 | 705 |
| 50 | 758 |
| 70 | 805 |
| 90 | 886 |
| E.P. | 959 |
| Total Sulfur, wt. % | 3.01 |
| Total Nitrogen, wt. % | 0.12 |
| Aromatics, Vol. % | 56.4 |
| Paraffins and Naphthenes, vol. % | 43.6 |
| Pour Point, °F. | 65 |

The hereinabove described vacuum gas oil was processed in a small-scale pilot plant over a fixed bed of Catalyst 1 with a reactor pressure of 2000 psig, a liquid hourly space velocity of 1.0, a hydrogen circulation rate of 12,000 SCFB and a reactor temperature of 760° F. These test conditions define a standard relative activity test procedure whereby a relative activity number is calculated. The relative activity number is a comparison of the activity of an experimental catalyst with the activity of a standard commercial hydrocracking catalyst which activity is arbitrarily assigned a value of 100. In this case, the standard commercial hydrocracking catalyst was a silica-alumina based catalyst comprising nickel and tungsten and which catalyst as mentioned before was assigned to relative activity of 100. According to the standard test procedure, the Catalyst 1 demonstrated a relative activity of 24. The results of this example are summarized in Table II. From these results, Catalyst 1 is a poor candidate or prototype for a commercial hydrocracking catalyst.

EXAMPLE II

This example describes the preparation and testing of a silica-alumina-vanadium catalyst which comprises 2 weight percent vanadium. The silica-alumina material was a co-gelled support material and was prepared by the hereinabove described oil-drop method. The ratio of silica and alumina sources was selected to yield a 50/50 mixture of silica and alumina. The finished silica-alumina support material was in the form of 1/16 inch spheres and had an apparent bulk density of about 0.6. A portion of the hereinabove described silica-alumina carrier material was impregnated with a methanol solution of vanadium chloride ($VCl_3$) using a Sohxlet extractor. After the vanadium component was incorporated, the methanol was removed in a rotary evaporator. The impregnated spheres were then oxidized in air (calcined) at a temperature of 1100° F. The finished catalyst contained 2 weight percent vanadium. This batch of finished catalyst will hereinafter be referred to as Catalyst 2. Catalyst 2 was then used in the hydrocracking of a vacuum gas oil having the properties as described in Table I. The hereinabove described vacuum gas oil was processed in the same pilot plant which was used in Example I over a fixed bed of Catalyst 2 utilizing the operating conditions of the standard relative activity test procedure as described in Example I. When Catalyst 2 was compared with the standard commercial hydrocracking catalyst selected and used in Example I, Catalyst 2 demonstrated a relative activity of 28. The results of this example are summarized in Table II. From these results, Catalyst 2 is also a poor candidate for a commercial hydrocracking catalyst.

EXAMPLE III

This example describes the preparation and testing of a silica-alumina-nickel-vanadium catalyst which comprised 2 weight percent vanadium and 0.6 weight percent nickel. This catalyst is a preferred embodiment of the present invention and was prepared and utilized in accordance with other preferred embodiments of the present invention. The silica-alumina material was a co-gelled support material and was prepared by the hereinabove described oil-drop method. The ratio of silica and alumina sources was selected to yield a 50/50 mixture of silica and alumina. The finished silica-alumina support material was in the form of 1/16 inch spheres and had an apparent bulk density of about 0.6. A portion of the hereinabove described silica-alumina carrier material was impregnated with an aqueous solution of nickel nitrate. The impregnated spheres were dried and then oxidized in air (calcined) at a temperature of 1100° F. The resulting oxidized spheres were impregnated with a methanol solution of vanadium chloride ($VCl_3$) using a Sohxlet extractor. After the vanadium component was incorporated, the methanol was removed in a rotary evaporator. The impregnated spheres were then oxidized at a temperature of 1100° F. The finished catalyst contained 0.6 weight percent nickel and 2 weight percent vanadium. This batch of finished catalyst will hereinafter be referred to as Catalyst 3. Catalyst 3 was then used in the hydrocracking of a vacuum gas oil having the properties as described in Table I. The hereinabove described vacuum gas oil was processed in the same pilot plant which was used in the previous examples over a fixed bed of Catalyst 3 while utilizing the operating conditions of the standard relative activity test procedure as described in Example I. When Catalyst 3 was compared with the standard commercial hydrocracking catalyst selected and used in both earlier examples, Catalyst 3 demonstrated a relative activity of 62. The results of this example are summarized in Table II. From these results, it is readily apparent that a hydrocracking catalyst comprising silica and alumina and containing both a nickel component and a vanadium component exhibits unexpectedly good hydrocarbon conversion characteristics.

Although the catalyst of the present invention which comprises nickel and vanadium on a silica-alumina carrier material demonstrated a relative activity of 62 and the commercial hydrocracking catalyst which was selected for comparison purposes had an assigned relative activity of 100, the utility of the catalyst of the present invention is not vitiated by such a comparison showing. For instance, in cases where a very high activity catalyst is not warranted, the catalyst of the present invention provides an attractive alternative catalyst. Also, in the event that tungsten becomes scarce or unavailable, or that the price of tungsten compared to that of vanadium dictates a substitute metal in a tungsten-containing catalyst, the catalyst of the present invention provides an attractive, or perhaps necessary, alternative.

EXAMPLE IV

This example describes the preparation and testing of a silica-alumina-nickel-vanadium catalyst which comprised 2 weight percent vanadium and 0.6 weight percent nickel. This catalyst is also a preferred embodiment of the present invention and was prepared and utilized in accordance with other preferred embodiments of the present invention. The silica-alumina material was a co-gelled support material and was prepared by the hereinabove described oil-drop method. The ratio of silica and alumina sources was selected to yield a 50/50 mixture of silica and alumina. The finished silica-alumina support material was in the form of 1/16 inch spheres and had an apparent bulk density of about 0.6. A portion of the hereinabove described silica-alumina carrier material was impregnated with a methanol solution containing methanol, nickel chloride and vanadium oxychloride. After the vanadium and nickel components were incorporated, the methanol was removed in a rotary evaporator. The impregnated spheres were dried and then oxidized in air (calcined) at a temperature of 1100° F. The finished catalyst contained 0.6 weight percent nickel and 2 weight percent vanadium. This batch of finished catalyst will hereinafter be referred to as Catalyst 4. Catalyst 4 was then used in the hydrocracking of a vacuum gas oil having the properties as described in Table I. The hereinabove described vacuum gas oil was processed in the same pilot plant which was used in the previous examples over a fixed bed of Catalyst 4 while utilizing the operating conditions of the standard relative activity test procedure as described in Example I. When Catalyst 4 was compared with the standard commercial hydrocracking catalyst selected and used in the earlier examples, Catalyst 4 demonstrated a relative activity of 59. The results of this example are summarized in Table II. From these results, it is apparent that co-impregnation of the nickel component and the vanadium component with an alcoholic solution also provides a catalyst which exhibits unexpectedly good hydrocarbon conversion characteristics.

TABLE II

SUMMARY OF CATALYST TESTS

| Catalyst | Catalyst Composition | Relative Activity |
|---|---|---|
| 1 | 50/50 Silica-Alumina with 0.6% Nickel | 24 |
| 2 | 50/50 Silica-Alumina with 2% Vanadium | 28 |
| 3 | 50/50 Silica-Alumina with 0.6% Nickel and 2% Vanadium (Sequential Impregnation) | 62 |
| 4 | 50/50 Silica-Alumina with 0.6% Nickel and 2% Vanadium (Co-impregnation) | 59 |

The foregoing description and examples clearly illustrate the improvements encompassed by the present invention and the benefits to be afforded therefrom.

We claim as our invention:

1. A method for the preparation of catalysts, having a hydrocracking activity, comprising a combination of a catalyst composite comprising a combination of a carrier material, a nickel component, which is incorporated in said composite by means of an aqueous nickel solution in an amount from about 0.1 to about 10 weight percent of said composite based on the elemental metal and a vanadium component which is incorporated in said catalytic composite by means of an alcoholic solution of a vanadium compound in an amount from about 0.1 to about 10 weight percent of said composite based on the elemental metal, said carrier material comprising a co-gelled silica-alumina carrier material which comprises from about 20 weight percent to about 80 ght percent silica, which method comprises:
   (a) the sequential incorporation of each metal component on said carrier material; and
   (b) the calcination of said carrier material following each metal component incorporation.

2. A method for the preparation of catalysts, having hydrocracking activity, comprising a combination of a catalytic composite comprising a combination of a carrier material, a nickel component which is incorporated in said composite by means of an aqueous nickel solution in an amount from about 0.1 to about 10 weight percent of said composite based on the elemental metal, said carrier material comprising a co-gelled silica-alumina carrier material which comprises from about 20 weight percent to about 80 weight percent silica, which method comprises:
   (a) impregnating said co-gelled silica-alumina carrier material with an aqueous solution of a nickel compound;
   (b) calcining the resulting impregnated carrier material from step (a);
   (c) impregnating the resulting calcined carrier material containing a nickel component from step (b) with an alcoholic solution of a vanadium compound; and
   (d) calcining the resulting impregnated carrier material containing a nickel component and a vanadium component from step (c).

3. A method for the preparation of catalysts, having hydrocracking activity, comprising a combination of a catalytic composite comprising a combination of a carrier material, a nickel component in an amount from about 0.1 to about 10 weight percent of said composite based on the elemental metal and a vanadium component in an amount from about 0.1 to about 10 weight percent of said composite based on the elemental metal, said carrier material comprising a co-gelled silica-alumina carrier material which comprises from about 20 weight percent to about 80 weight percent silica, which method comprises:

(a) impregnating said co-gelled silica-alumina carrier material with an alcoholic solution of a vanadium compound and a nickel compound; and (b) calcining the resulting impregnated carrier material containing a nickel component and a vanadium component from step (a).

4. The method of claim 2 wherein calcination is conducted at a temperature from about 700° F. to about 1300° F.

* * * * *